United States Patent
Akiyama

(10) Patent No.: US 10,474,016 B2
(45) Date of Patent: Nov. 12, 2019

(54) WAVELENGTH CONVERTER, LIGHT SOURCE APPARATUS, AND PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/106,159

(22) Filed: Aug. 21, 2018

(65) Prior Publication Data

US 2019/0064642 A1    Feb. 28, 2019

(30) Foreign Application Priority Data

Aug. 22, 2017    (JP) ................. 2017-159409

(51) Int. Cl.
     *G03B 21/20*      (2006.01)
     *F21K 9/64*      (2016.01)
     *G03B 21/16*      (2006.01)

(52) U.S. Cl.
     CPC ............ *G03B 21/16* (2013.01); *F21K 9/64* (2016.08); *G03B 21/204* (2013.01); *G03B 21/2013* (2013.01)

(58) Field of Classification Search
     CPC .. G03B 21/204; G03B 21/16; G03B 21/2013; F21K 9/64; F21V 29/50; F21V 9/30; H04N 9/3158; H04N 9/3161
     See application file for complete search history.

(56) References Cited

U.S. PATENT DOCUMENTS

| 2012/0236894 | A1 | 9/2012 | Onose et al. |
| 2017/0059977 | A1* | 3/2017 | Ogino ............... G03B 21/2013 |
| 2017/0205049 | A1 | 7/2017 | Khrushchev |
| 2017/0227836 | A1 | 8/2017 | Takagi et al. |
| 2017/0315431 | A1* | 11/2017 | Schnarrenberger ......... G03B 21/2066 |
| 2018/0003363 | A1* | 1/2018 | Furuyama ............... F21V 9/40 |

FOREIGN PATENT DOCUMENTS

| JP | 2012-169049 A | 9/2012 |
| WO | 2006/060160 A1 | 6/2006 |
| WO | 2016/125611 A1 | 8/2016 |
| WO | 2017/040433 A1 | 3/2017 |

OTHER PUBLICATIONS

Jan. 24, 2019 European Search Report issued in European Application No. 18190282.6.
"Optical contact bonding." Wikipedia, Jan. 7, 2017, XP055541085, Retrieved from the Internet: URL:https://web.archive.org/web/20170107054601/https://en.wikipedia.org/wiki/Optical_contact_bonding [retrieved on Jan. 11, 2019].

* cited by examiner

*Primary Examiner* — Ryan D Howard
(74) *Attorney, Agent, or Firm* — Oliff PLC

(57) ABSTRACT

A wavelength converter includes a wavelength conversion layer formed of a ceramic phosphor and having a light incident surface on which excitation light is incident and a light exiting surface which faces the light incident surface, a light transmitting layer formed integrally with the light incident surface of the wavelength conversion layer, and a light transmitting member provided on a side of the light transmitting layer that is the side on which the excitation light is incident. The light transmitting layer and the light transmitting member are bonded to each other with the aid of optical contact.

14 Claims, 4 Drawing Sheets

WAVELENGTH CONVERTER, LIGHT SOURCE APPARATUS, AND PROJECTOR

BACKGROUND

1. Technical Field

The present invention relates to a wavelength converter, a light source apparatus, and a projector.

2. Related Art

For example, JP-A-2012-169049 discloses a light source apparatus including an excitation light source that radiates excitation light, an optical system that focuses the excitation light, a phosphor (wavelength conversion layer) that radiates fluorescence when excited with the focused excitation light, and a glass substrate on which the phosphor is formed. In the light source apparatus, to dissipate heat generated in the phosphor so that the phosphor is cooled, the phosphor is formed on one surface of the glass substrate, and a cooling mechanism formed of a heat sink is provided on the one surface of the glass substrate (surface on which excitation light is incident).

In the light source apparatus described above, it is also conceivable to more efficiently cool the phosphor by providing a light transmitting member that excels in thermal conductivity and heat dissipation on the excitation light incident side of the phosphor. In the case where the light transmitting member is provided on the excitation light incident side of the phosphor, an adhesive for bonding the light incident surface of the wavelength conversion layer to the light transmitting member is required. The adhesive needs to not only have a refractive index between 1.76 (refractive index of light transmitting member) and 1.83 (refractive index of wavelength conversion layer) to suppress interface reflection but excel in transparency and heat resistance. However, no adhesive satisfies the requirements described above.

SUMMARY

An advantage of some aspects of the invention is to provide a wavelength converter that excels in ability to cool a wavelength conversion layer. Another advantage of some aspects of the invention is to provide a light source apparatus including the wavelength converter. Another advantage of some aspects of the invention is to provide a projector including the light source apparatus.

According to a first aspect of the invention, a wavelength converter is provided. The wavelength converter includes a wavelength conversion layer formed of a ceramic phosphor and having a light incident surface on which excitation light is incident and a light exiting surface which faces the light incident surface, a light transmitting layer formed integrally with the light incident surface of the wavelength conversion layer, and a light transmitting member provided on a side of the light transmitting layer that is a side on which the excitation light is incident, and the light transmitting layer and the light transmitting member are bonded to each other with the aid of optical contact.

In the wavelength converter according to the first aspect, since the light transmitting layer and the light transmitting member are bonded to each other with the aid of optical contact, the light transmitting layer and the light transmitting member can be bonded to each other without using any adhesive between the light transmitting layer and the light transmitting member.

Further, since the wavelength conversion layer and the light transmitting layer are formed integrally with each other, the wavelength conversion layer and the light transmitting layer can be bonded to each other with the use of no adhesive between the wavelength conversion layer and the light transmitting layer.

Therefore, since the light transmitting member, which functions as a heat dissipating member, can be disposed on the light transmitting layer (side facing light incident surface) with the use of no adhesive, the ability to cool the wavelength conversion layer can be improved.

In the first aspect described above, it is desirable that the light transmitting layer is made of transparent alumina, and that the wavelength conversion layer and the transparent alumina of the light transmitting layer are formed integrally with each other in a sintering process.

According to the configuration described above, since the wavelength conversion layer and the transparent alumina as the light transmitting layer can be formed integrally with each other, no adhesive is present between the wavelength conversion layer and the transparent alumina as the light transmitting layer, whereby no interface reflection occurs between the wavelength conversion layer and the transparent alumina as the light transmitting layer. The excitation light can therefore pass through the transparent alumina as the light transmitting layer and efficiently impinge on the light incident surface of the wavelength conversion layer (interface between wavelength conversion layer and light transmitting layer).

Therefore, the efficiency at which the excitation light is incident on the wavelength conversion layer can be increased, and a decrease in the wavelength conversion efficiency can be suppressed. Further, since heat generated in the wavelength conversion layer can be dissipated via the light transmitting layer and the light transmitting member, the ability to cool the wavelength conversion layer can be improved and a decrease in the wavelength conversion efficiency of the wavelength conversion layer can be suppressed in the wavelength converter provided in the first aspect.

In the first aspect described above, it is preferable that the light transmitting member is made of sapphire.

According to the configuration described above, since the light transmitting layer is made of the transparent alumina, and the light transmitting member is made of sapphire, the light transmitting layer and the light transmitting member are made of a substance expressed by the same molecular formula $Al_2O_3$. The light transmitting layer and the light transmitting member can therefore be bonded to each other with the aid of more satisfactory optical contact.

In the first aspect described above, it is preferable that the light transmitting member has a curved surface that protrudes in a direction opposite a traveling direction of the excitation light, and that a dichroic film that transmits the excitation light and reflects fluorescence emitted from the wavelength conversion layer is provided on the curved surface.

In the configuration described above, since the light transmitting layer and the light transmitting member are bonded to each other with the aid of optical contact, a dichroic film that transmits the excitation light and reflects the fluorescence cannot be provided between the light transmitting layer and the light transmitting member. Further, since the wavelength conversion layer and the light transmitting layer are formed integrally with each other, the dichroic film cannot be provided between the wavelength conversion layer and the light transmitting layer.

It is therefore preferable to provide the dichroic film on the curved surface of the light transmitting member in order to prevent the fluorescence produced in the wavelength conversion layer from exiting via the curved surface. The dichroic film allows the fluorescence produced in the wavelength conversion layer to be efficiently extracted via the light exiting surface.

Further, since the light transmitting member has the curved surface on the side on which the excitation light is incident, the excitation light can be focused on the light incident surface, for example, by causing the excitation light to be incident on the curved surface along a normal thereto. That is, the light transmitting member can function as the heat dissipating member without optically affecting the excitation light.

According to a second aspect of the invention, a light source apparatus is provided. The light source apparatus includes the wavelength converter according to the first aspect described above and an excitation light source that emits the excitation light.

The light source apparatus according to the second aspect, in which the wavelength conversion layer is efficiently cooled, can be improved in terms of the wavelength conversion efficiency and the reliability.

In the second aspect of the invention, it is preferable that a light source apparatus includes the wavelength converter according to the first aspect described above, an excitation light source that emits the excitation light, and alight focusing system that focuses the excitation light emitted from the excitation light source on the light incident surface of the wavelength conversion layer, that a center of a circle having a curvature radius of the curved surface is located on the light incident surface, and that a position where the excitation light is focused by the light focusing system coincides with the center of the circle having the curvature radius of the curved surface.

According to the configuration described above, the light focusing system can focus the excitation light on the light incident surface. The fluorescence conversion efficiency of the wavelength conversion layer can therefore be improved. Further, the light focusing system allows the excitation light to be incident on the curved surface of the light transmitting member along a normal thereto. Therefore, since the curved surface does not refract the excitation light, it is unnecessary to consider that the light transmitting member refracts the excitation light, whereby the light focusing system is readily designed.

The light transmitting member can therefore function as the heat dissipating member without optically affecting the excitation light.

According to a third aspect of the invention, a projector is provided. The projector includes the light source apparatus according to the second aspect described above, a light modulator that modulates light from the light source apparatus in accordance with image information to produce image light, and a projection optical apparatus that projects the image light.

The projector according to the third aspect, which includes the light source apparatus having improved wavelength conversion efficiency and improved reliability, can display high-luminance video images and have improved reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
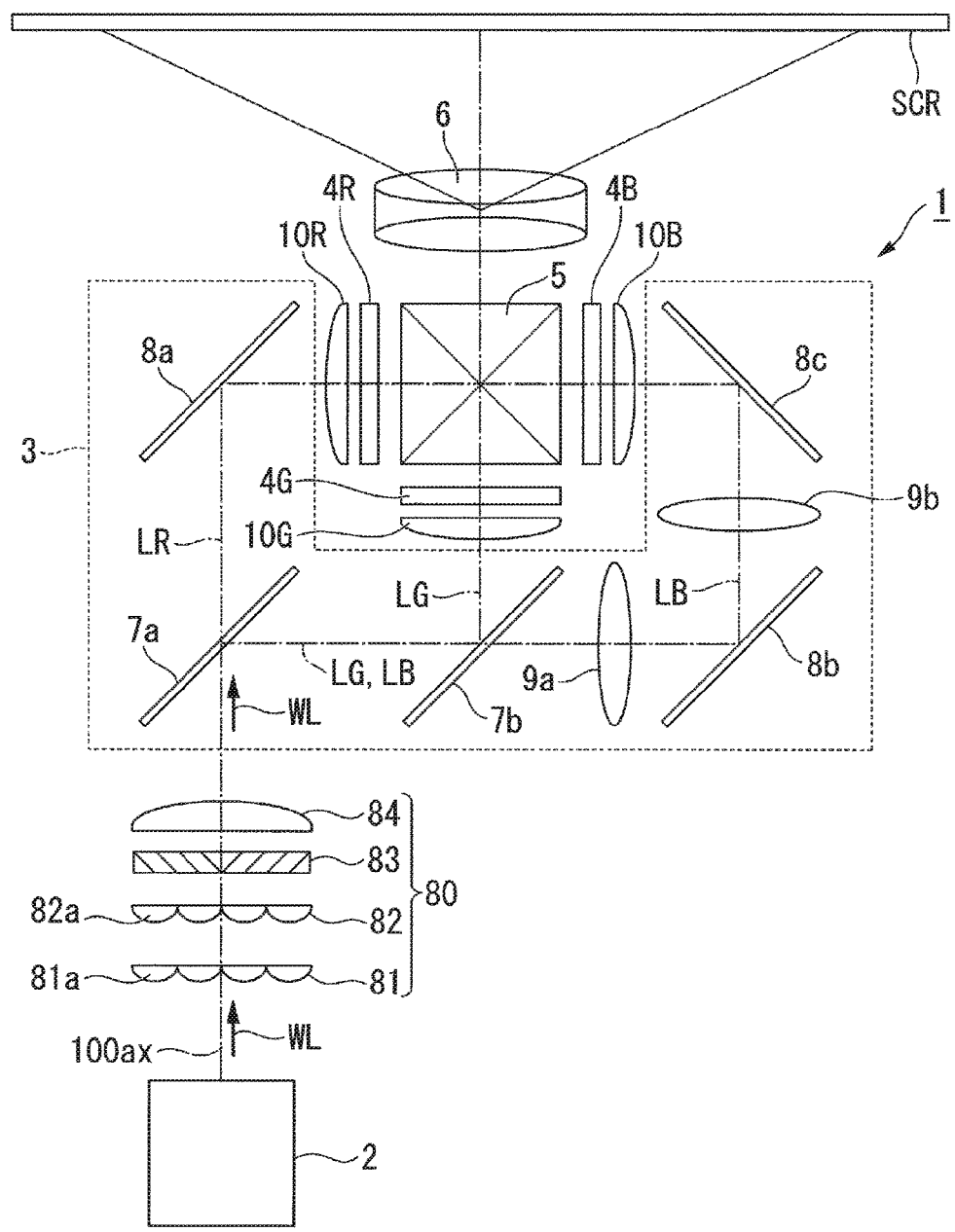
FIG. 1 shows a schematic configuration of a projector according to a first embodiment.

Embodiments of the invention will be described below in detail with reference to the drawings.

In the drawings used in the following description, a characteristic portion is enlarged for convenience in some cases for clarity of the characteristic thereof, and the dimension ratio and other factors of each component are therefore not always equal to actual values.

First Embodiment

Figure 2:
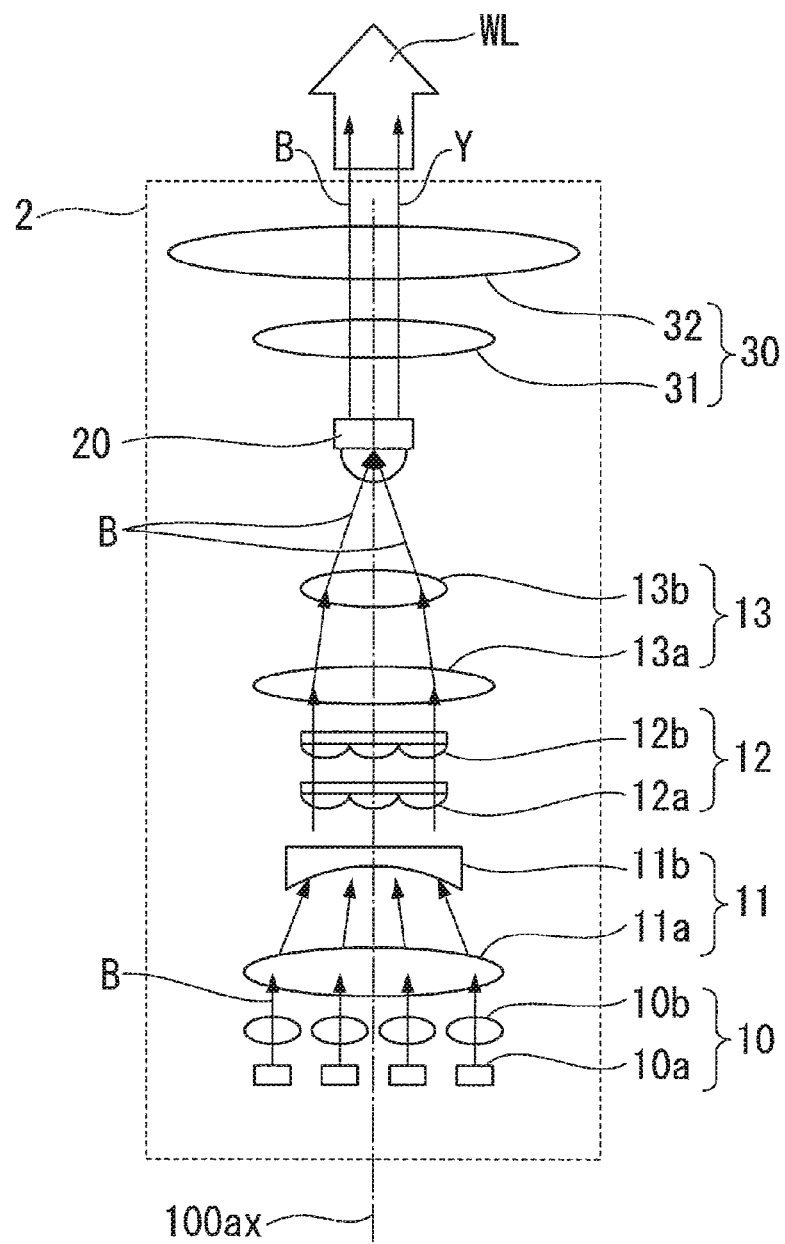
FIG. 2 shows a schematic configuration of a light source apparatus.

FIG. 1 shows a schematic configuration of a projector according to a first embodiment. FIG. 2 shows a schematic configuration of a light source apparatus.

A projector 1 according to the present embodiment is a projection-type image display apparatus that displays video images on a screen SCR, as shown in FIG. 1. The projector 1 includes a light source apparatus 2, a uniform illumination system 80, a color separation system 3, a light modulator 4R, a light modulator 4G, a light modulator 4B, a light combining system 5, and a projection optical apparatus 6.

In the present embodiment, the light source apparatus 2 shown in FIG. 2 outputs white illumination light WL, which is part of blue excitation light B emitted from a semiconductor laser but outputted without undergoing wavelength conversion combined with yellow fluorescence Y, which is produced by a wavelength converter 20, which performs wavelength conversion on the excitation light. The illumination light WL enters the color separation system 3 via the uniform illumination system 80.

Referring back to FIG. 1, the uniform illumination system 80 includes a first lens array 81, a second lens array 82, a polarization converter 83, and a superimposing lens 84.

The first lens array 81 includes a plurality of first lenses 81a, which divide the illumination light WL from the light source apparatus 2 into a plurality of sub-light fluxes. The plurality of first lenses 81a are arranged in a matrix in a plane perpendicular to an illumination optical axis 100ax.

The second lens array 82 includes a plurality of second lenses 82a, which correspond to the plurality of first lenses 81a of the first lens array 81. The plurality of second lenses 82a are arranged in a matrix in a plane perpendicular to the illumination optical axis 100ax.

The second lens array 82, along with the superimposing lens 84, forms images of the first lenses 81a of the first lens array 81 in the vicinity of an image formation area of each of the light modulators 4R, 4G, and 4B.

The polarization converter 83 converts each of the light fluxes having exited out of the second lens array 82 into linearly polarized light. The polarization converter 83 includes, for example, polarization separation films and retardation films (neither of them is shown).

The superimposing lens 84 collects the sub-light fluxes having exited out of the polarization converter 83 and superimposes the collected sub-light fluxes on one another in the vicinity of the image formation area of each of the light modulators 4R, 4G, and 4B.

The color separation system 3 separates the illumination light WL into red light LR, green light LG, and blue light LB. The color separation system 3 includes a first dichroic mirror 7a and a second dichroic mirror 7b, a first total reflection mirror 8a, a second total reflection mirror 8b, and a third total reflection mirror 8c, and a first relay lens 9a and a second relay lens 9b.

The first dichroic mirror 7a separates the illumination light WL from the light source apparatus 2 into the red light LR and the other light (green light LG and blue light LB). The first dichroic mirror 7a transmits the red light LR and reflects the other light (green light LG and blue light LB). On the other hand, the second dichroic mirror 7b reflects the green light LG and transmits the blue light LB to separate the other light (green light LG and blue light LB) into the green light LG and the blue light LB.

The first total reflection mirror 8a is disposed in the optical path of the red light LR and reflects the red light LR having passed through the first dichroic mirror 7a toward the light modulator 4R. On the other hand, the second total reflection mirror 8b and the third total reflection mirror 8c are disposed in the optical path of the blue light LG and guide the blue light LB having passed through the second dichroic mirror 7b to the light modulator 4B. The green light LG is reflected off the second dichroic mirror 7b toward the light modulator 4G.

The first relay lens 9a is disposed in the optical path of the blue light LB and on the light exiting side of the second dichroic mirror 7b. The second relay lens 9b is disposed in the optical path of the blue light LB and on the light exiting side of the second total reflection mirror 8b. The first relay lens 9a and the second relay lens 9b have the function of compensating optical loss of the blue light LB resulting from the fact that the optical path of the blue light LB is longer than the optical paths of the red light LR and the green light LG.

The light modulator 4R modulates the red light LR in accordance with image information to form image light corresponding to the red light LR. The light modulator 4G modulates the green light LG in accordance with image information to form image light corresponding to the green light LG. The light modulator 4B modulates the blue light LB in accordance with image information to form image light corresponding to the blue light LB.

The light modulators 4R, 4G, and 4B are each made, for example, of a transmissive liquid crystal panel. Polarizers (not shown) are disposed on the light incident side and the light exiting side of each of the liquid crystal panels.

Field lenses 10R, 10G, and 10B are disposed on the light incident side of the light modulators 4R, 4G, and 4B, respectively. The field lenses 10R, 10G, and 10B parallelize the red light LR, the green light LG, and the blue light LB to be incident on the light modulators 4R, 4G, and 4B, respectively.

The image light fluxes from the light modulators 4R, 4G, and 4B enter the light combining system 5. The light combining system 5 combines the image light fluxes corresponding to the red light LR, the green light LG, and the blue light LB with one another and causes the combined image light to exit toward the projection optical apparatus 6. A cross dichroic prism is, for example, used as the light combining system 5.

The projection optical apparatus 6 is formed of a projection lens group, enlarges the combined image light from the light combining system 5, and projects the enlarged image light toward the screen SCR. An enlarged video images are thus displayed on the screen SCR.

Light Source Apparatus

The configuration of the light source apparatus 2 will be subsequently described.

The light source apparatus 2 includes an excitation light source unit 10, an afocal system 11, a homogenizer system 12, a light focusing system 13, a wavelength converter 20, and a pickup system 30, as shown in FIG. 2.

The excitation light source unit 10 is formed of a plurality of semiconductor lasers (excitation light sources) 10a, which each emit the blue excitation light B formed of a laser beam, and a plurality of collimator lenses 10b. The intensity of the emitted excitation light B peaks, for example, at 445 nm. The plurality of semiconductor lasers 10a are arranged in an array in a single plane perpendicular to the illumination optical axis 100ax. The semiconductor lasers 10a can instead each be a semiconductor laser that emits blue light having a wavelength other than 445 nm, for example, 455 nm or 460 nm.

The collimator lenses 10b are arranged in an array in a single plane perpendicular to the illumination optical axis 100ax in correspondence with the semiconductor lasers 10a. The collimator lenses 10b each convert the excitation light B emitted from the corresponding semiconductor laser 10a into parallelized light.

The afocal system 11 includes, for example, a convex lens 11a and a concave lens 11b. The afocal system 11 reduces the diameter of each of the parallelized light fluxes formed of the plurality of laser beams outputted from the excitation light source unit 10.

The homogenizer system 12 includes, for example, a first multi-lens array 12a and a second multi-lens array 12b. The homogenizer system 12 converts the optical intensity distribution of the excitation light into a uniform distribution, what is called a top-hat distribution, on a wavelength conversion layer that will be described later. The homogenizer system 12, along with the light focusing system 13, superimposes a plurality of narrow light fluxes having exited out of a plurality of lenses of the first multi-lens array 12a and the second multi-lens array 12b on each other on the wavelength converter 20. The excitation light B, with which the wavelength converter 20 is irradiated, thus has a uniform optical intensity distribution.

The light focusing system 13 includes, for example, a first lens 13a and a second lens 13b. In the present embodiment, the first lens 13a and the second lens 13b are each formed of a convex lens. The light focusing system 13 is disposed in the optical path from the homogenizer system 12 to the wavelength converter 20, focuses the excitation light B, and causes the focused excitation light B to be incident on the wavelength converter 20. The configuration of the wavelength converter 20 will be described later.

The pickup system 30 includes, for example, a first collimation lens 31 and a second collimation lens 32. The pickup system 30 is a parallelizing system that roughly parallelizes the light emitted from the wavelength converter 20. The first collimation lens 31 and the second collimation lens 32 are each formed of a convex lens.

Wavelength Converter

The configuration of the wavelength converter will next be described.

Figure 3:
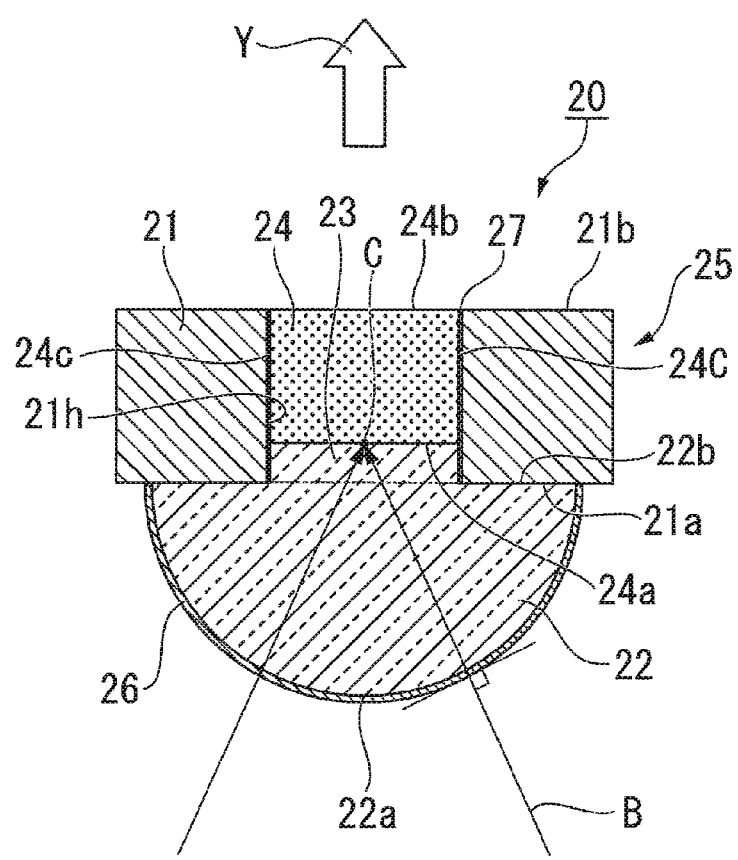
FIG. 3 shows a cross-sectional configuration of a wavelength converter.

FIG. 3 shows a cross-sectional configuration of the wavelength converter 20. FIG. 3 corresponds to across section of the wavelength converter 20 taken along a plane including the illumination optical axis 100ax in FIG. 2.

The wavelength converter 20 includes a transparent alumina layer (light transmitting layer) 23, a wavelength conversion layer 24, a cooler 25, a dichroic film 26, and a reflection film 27, as shown in FIG. 3.

The wavelength conversion layer 24 has a light incident surface 24a, on which the excitation light B outputted from the excitation light source unit 10 is incident, a light exiting surface 24b, which faces the light incident surface 24a, and an intersection surface 24c, which interests the light incident surface 24a and the light exiting surface 24b. The intersection surface 24c corresponds to the side surface of the wavelength conversion layer 24. The intersection surface 24c further corresponds to the outer circumferential surface of the wavelength conversion layer 24 excluding the light incident surface 24a and the light exiting surface 24b. The intersection surface 24c is formed by connecting the end of the light incident surface 24a to the end of the light exiting surface 24b.

The wavelength conversion layer 24 is a transmissive wavelength conversion layer that outputs the fluorescence Y, which has been produced by the excitation light B incident via the light incident surface 24a, out of the light exiting surface 24b, which faces the light incident surface 24a. The light exiting surface 24b is formed of a flat surface.

In the present embodiment, the wavelength conversion layer 24 contains phosphor particles that convert the blue excitation light B into the yellow fluorescence light Y. The phosphor particles are made, for example, of a YAG-based (yttrium-aluminum-garnet-based) phosphor. The phosphor particles may be made of one material or may be a mixture of particles made of two or more materials. The wavelength conversion layer 24 preferably excels in heat resistance and surface processability. In the present embodiment, the wavelength conversion layer 24 is made of a ceramic phosphor formed by sintering the phosphor particles.

The transparent alumina layer 23 is formed integrally with the light incident surface 24a of the wavelength conversion layer 24. Specifically, the transparent alumina layer 23 is formed integrally with the wavelength conversion layer 24 by sintering alumina ($Al_2O_3$) along with the phosphor particles that form the wavelength conversion layer 24. The transparent alumina layer 23 and the wavelength conversion layer 24 are therefore bonded to each other at a particle level, so that no adhesive or bonding material is present between the transparent alumina layer 23 and the light incident surface 24a of the wavelength conversion layer 24. The thickness of the transparent alumina layer 23 is desirably set at a value one-fifth the thickness of the wavelength conversion layer 24 or smaller. For example, in a case where the thickness of the wavelength conversion layer 24 ranges from about 500 to 1000 μm, the thickness of the transparent alumina layer 23 is desirably set at a value ranging from about 100 to 200 μm.

Therefore, when the excitation light B passes through the transparent alumina layer 23 and impinges on the light incident surface 24a of the wavelength conversion layer 24, no interface reflection occurs because no bonding member is present between the transparent alumina layer 23 and the light incident surface 24a of the wavelength conversion layer 24. The excitation light B therefore efficiently passes through the transparent alumina layer 23 and impinges on the light incident surface 24a. After the transparent alumina layer 23 and the wavelength conversion layer 24 are formed integrally with each other, the interface between the transparent alumina layer 23 and the wavelength conversion layer 24 corresponds to the light incident surface 24a of the wavelength conversion layer 24.

In the present embodiment, the term "integral formation" means that the transparent alumina layer 23 and the intersection surface 24c are formed with no adhesive or bonding material present between the transparent alumina layer 23 and the light incident surface 24a of the wavelength conversion layer 24. The "integral formation" in the present embodiment therefore includes not only formation in a sintering process but formation of the transparent alumina layer 23 by sputtering or otherwise depositing alumina onto the wavelength conversion layer 24.

In the present embodiment, the cooler 25 includes a support member 21 and a light transmitting member 22. The support member 21 is formed, for example, of a rectangular plate and has a first surface 21a and a second surface 21b, which face each other in the plate thickness direction. The first surface 21a is a surface facing the light focusing system 13, and the second surface 21b is a surface facing the pickup system 30.

The support member 21 has a hole 21h, which passes through the portion between the first surface 21a and the second surface 21b in the thickness direction. The support member 21 may be made of a light transmitting material, such as glass and quartz, or may be made of a material that does not transmit light, such as a metal. In the case where the support member 21 is made of a metal material, it is desirable to use a metal that excels in heat dissipation, such as aluminum and copper.

The wavelength conversion layer 24 is disposed in the hole 21h of the support member 21. The wavelength conversion layer 24 is so disposed that the intersection surface 24c faces the inner circumferential surface 21c of the hole 21h. Similarly, the transparent alumina layer 23 is so disposed that the surface other than the surface facing the light transmitting member 22 and the surface facing the wavelength conversion layer 24 faces the inner circumferential surface 21c of the hole 21h. The transparent alumina layer 23, which has been formed integrally with the wavelength conversion layer 24, is therefore disposed in the hole 21h of the support member 21.

In the present embodiment, the reflection film 27 is provided on the inner circumferential surface 21c of the hole 21h. The reflection film 27 is provided between the support member 21 and the wavelength conversion layer 24 and between the support member 21 and the transparent alumina layer 23.

The reflection film 27 reflects the fluorescence Y produced in the wavelength conversion layer 24. The reflection film 27 further reflects the excitation light B that has entered the wavelength conversion layer 24 but has not been converted into the fluorescence. The reflection film 27 is desirably made of a metal material having high optical reflectance, such as aluminum and copper.

The thus configured wavelength conversion layer 24 causes the fluorescence Y that has been produced therein and the excitation light B that has not been used to produce the fluorescence Y to efficiently exit out of the wavelength conversion layer 24 via the light exiting surface 24b. The wavelength conversion layer 24 therefore outputs white light that is the combination of the yellow fluorescence Y and the blue excitation light B as the illumination light WL.

The light transmitting member 22 is intended to dissipate heat at the light incident surface 24a of the wavelength conversion layer 24. To this end, in the present embodiment, the light transmitting member 22 is made of sapphire, which excels in thermal conductivity and heat resistance. Although the light transmitting member 22 is disposed on the upstream side of the light incident surface 24a in the optical path of the excitation light B, loss of the excitation light B due to the passage thereof through the light transmitting member 22 can be reduced because sapphire excels in optical transparency.

In the present embodiment, the light transmitting member 22 has a roughly hemispherical shape having a curved surface 22a, which protrudes in one direction, and a flat surface 22b, which is provided on the side in the other direction. The curved surface 22a protrudes in the direction (downward in FIG. 3) opposite the traveling direction of the excitation light B from the excitation light source unit 10 (upward in FIG. 3).

The light transmitting member 22 is provided on a side of the transparent alumina layer 23 (light transmitting layer) that is the side on which the excitation light B is incident. The light transmitting member 22 is provided on a side of the transparent alumina layer 23 that is the side opposite the wavelength conversion layer 24. The light transmitting member 22 is provided on a side of the transparent alumina layer 23 that is the side opposite the interface (light incident surface 24a) between the transparent alumina layer 23 and the wavelength conversion layer 24. That is, the flat surface 22b of the light transmitting member 22 is so disposed as to face the light incident surface 24a of the wavelength conversion layer 24.

In the present embodiment, the transparent alumina layer 23 and the light transmitting member 22 are bonded to each other with the aid of optical contact. The optical contact is a technology for bonding the surfaces of at least two precisely polished members to each other with the use of no adhesive or bonding material but intermolecular force between molecules. Members bonded to each other with the aid of optical contact is integrated with each other.

The transparent alumina layer 23 is formed integrally with the wavelength conversion layer 24, as described above. The wavelength converter 20 according to the present embodiment therefore has a structure in which the light transmitting member 22, the transparent alumina layer 23, and the wavelength conversion layer 24 are integrated with one another.

To achieve the optical contact, the bonding surfaces of the transparent alumina layer 23 and the light transmitting member 22 need to be highly flat. For example, the pre-bonded surface of the transparent alumina layer 23 (surface located on the side opposite the wavelength conversion layer 24 and corresponding to the light incident surface on which the excitation light B is incident) and the pre-bonded surface of the light transmitting member 22 (part of the flat surface 22b) need to have flatness of one-tenth the wavelength of the excitation light B or smaller. Using the transparent alumina layer 23 and the light transmitting member 22 having the flatness of this level allows bonding therebetween with the aid of optical contact.

The transparent alumina layer 23 in the present embodiment is made of alumina ($Al_2O_3$) of high purity (at least 99%, for example). The light transmitting member 22, which is made of sapphire, and the transparent alumina layer 23 are therefore satisfactorily bonded to each other with the aid of optical contact.

No bonding interface is present between the transparent alumina layer 23 and the light transmitting member 22 bonded to each other with the aid of optical contact. No bonding member (adhesive) is therefore present between the transparent alumina layer 23 and the light transmitting member 22, whereby the transparent alumina layer 23 and the light transmitting member 22 form an integral structure.

Therefore, when the excitation light B passes through the light transmitting member 22 and impinges on the transparent alumina layer 23, no interface reflection occurs because no bonding member is present between the light transmitting member 22 and the transparent alumina layer 23. The excitation light B therefore passes through the light transmitting member 22 and is efficiently introduced into the transparent alumina layer 23.

The thus configured wavelength converter 20 according to the present embodiment allows the light transmitting member 22, which functions as a heat dissipating member, to be disposed on the side facing the light incident surface 24a of the wavelength conversion layer 24 with the use of no adhesive. The wavelength converter 20 provided in the present embodiment therefore excels in the ability to cool the wavelength conversion layer 24.

In the present embodiment, the position SP where the excitation light B outputted from the excitation light source unit 10 is focused by the light focusing system 13 coincides with the center C of the circle having the curvature radius of the curved surface 22a of the light transmitting member 22. That is, the light focusing system 13 focuses the excitation light B in such a way that the excitation light B is directed to the center of the circle having the curvature radius of the curved surface 22a of the light transmitting member 22. The excitation light B traveling via the light focusing system 13 is therefore incident on the curved surface 22a of the light transmitting member 22 along a normal to the curved surface 22a. The curved surface 22a therefore does not refract the excitation light B. As described above, the light transmitting member 22 in the present embodiment does not function as a lens that refracts the excitation light B. The light transmitting member 22 therefore only functions as a heat dissipating member without optically affecting the excitation light B.

In a case where the light transmitting member 22 can provide the same effect as that provided in the case where the light focus position SP coincides with the center C of the circle having the radius of curvature, the light focus position SP does not need to coincide with the center C of the circle having the radius of curvature. That is, the light focus position SP may slightly deviate from the center C of the circle having the radius of curvature.

Further, in the present embodiment, the center of the circle having the curvature radius of the curved surface 22a of the light transmitting member 22 is located on the light incident surface 24a of the wavelength conversion layer 24.

In the wavelength converter 20 according to the present embodiment, when the excitation light B having traveled through the light focusing system 13 passes through the light transmitting member 22, the state of the focused excitation light B does not change due to refraction. It is therefore unnecessary to consider that the light transmitting member 22 refracts the excitation light B, whereby the light focusing system 13 is readily designed.

The light focusing system 13 therefore allows the optical intensity distribution of the excitation light B on the light incident surface 24a of the wavelength conversion layer 24 to be a highly uniform top-hat-shaped distribution. The optical density on the light incident surface 24a therefore decreases, whereby the fluorescence conversion efficiency of the wavelength conversion layer 24 can be improved.

The above description has been made with reference to the case where the center C of the circle having the curvature radius of the curved surface 22a of the light transmitting member 22 is located on the light incident surface 24a. In the case where the transparent alumina layer 23 is thinner than the wavelength conversion layer 24, the center C of the circle having the curvature radius of the curved surface 22a may be located in the transparent alumina layer 23. The reason for this is that although the position where the excitation light B is focused is slightly shifted from the light incident surface 24a in this case, the influence of the shift is neglectable.

Similarly, in the case where the light transmitting member 22 can provide the same effect and advantage as those provided in the case where the center C of the circle having the curvature radius of the curved surface 22a of the light transmitting member 22 is located on the light incident surface 24a, the center C of the circle having the curvature radius may not be located on the light incident surface 24a.

The flat surface 22b of the light transmitting member 22 is thermally in contact with the first surface 21a of the support member 21. The state in which the flat surface 22b is thermally in contact with the first surface 21a means a state in which the flat surface 22b and the first surface 21a are connected to each other in a thermally conductible manner. To this end, the flat surface 22b and the first surface 21a may be directly in contact with each other or indirectly in contact with each other via a bonding member. The bonding member preferably has high thermal conductivity. Examples of the bonding member may include solder and a thermally conductive sheet.

The dichroic film 26 is provided on the curved surface 22a of the light transmitting member 22. The dichroic film 26 is characterized in that it transmits the excitation light B and reflects the fluorescence Y emitted from the wavelength conversion layer 24. Providing the thus functioning dichroic film 26 prevents the fluorescence Y produced in the wavelength conversion layer 24 from exiting via the curved surface 22a. The fluorescence Y produced in the wavelength conversion layer 24 can therefore be efficiently extracted via the light exiting surface 24b.

The wavelength conversion layer 24 generates heat when it produces the fluorescence Y. The heat generated by the wavelength conversion layer 24 is transferred to the support member 21 via the intersection surface 24c and the reflection film 27 and then dissipated.

In the wavelength conversion layer 24, a large amount of heat is generated at the light incident surface 24a. In the wavelength converter 20 according to the present embodiment, the transparent alumina layer 23 is formed integrally with the light incident surface 24a of the wavelength conversion layer 24, and the light transmitting member 22 is bonded to the transparent alumina layer 23 with the aid of optical contact. The heat at the light incident surface 24a is therefore transferred to the transparent alumina layer 23 and the light transmitting member 22, which excel in heat dissipation and thermal conductivity, and dissipated.

The thermal connection between the light transmitting member 22 is to the support member 21 allows improvement in the ability of the cooler 25, which includes the support member 21 and the light transmitting member 22, to cool the wavelength conversion layer 24. Therefore, the heat dissipation capability of the wavelength conversion layer 24 is improved, and a decrease in the wavelength conversion efficiency of the wavelength converter 20 can be suppressed.

The light source apparatus 2 according to the present embodiment can therefore produce bright illumination light WL containing bright fluorescence Y. The projector according to the present embodiment can therefore display bright video images on the screen SCR by using the bright illumination light WL.

Second Embodiment

A light source apparatus according to a second embodiment of the invention will next be described.

The configuration of the light source apparatus according to the present embodiment, which will be described below, differs from the configuration in the first embodiment described above in that the yellow fluorescence produced in the wavelength converter is combined with blue light produced in an optical system different from the optical system to which the wavelength converter belongs to produce the white illumination light. Therefore, in the following description, the configuration of the light source apparatus will be described in detail, and portions common to the first and second embodiments will not be described. Further, in the drawings used in the following description, components common to those in the first embodiment have the same reference characters.

Figure 4:
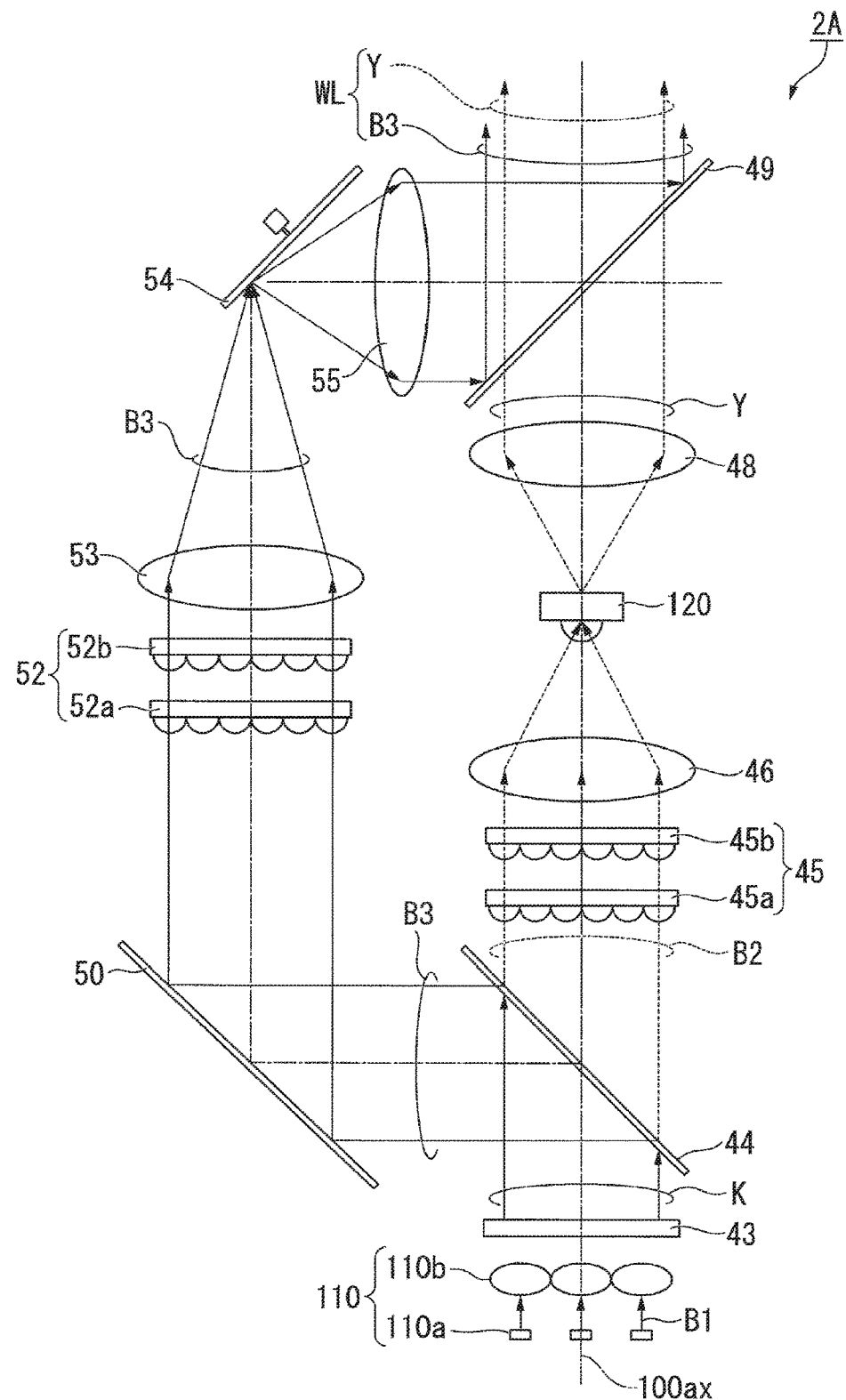
FIG. 4 shows the configuration of a light source apparatus according to a second embodiment.

FIG. 4 shows the configuration of the light source apparatus according to the second embodiment.

A light source apparatus 2A includes an excitation light source unit 110, a retardation film 43, a polarization separator 44, a first homogenizer system 45, a first light focusing system 46, a wavelength converter 120, a first pickup lens 48, a dichroic mirror 49, a total reflection mirror 50, a second homogenizer system 52, a second light focusing system 53, a reflective rotary diffuser 54, and a second pickup lens 55, as shown in FIG. 4.

Out of the components that form the light source apparatus 2A, the excitation light source unit 110, the retardation film 43, the polarization separator 44, the first homogenizer system 45, the first light focusing system 46, the wavelength separator 120, the first pickup lens 48, and the dichroic mirror 49 are sequentially arranged along the illumination optical axis 100ax.

In the present embodiment, the excitation light source unit 110 is formed of a plurality of semiconductor lasers 110a, which each emit blue light B1 formed of a laser beam, and a plurality of collimator lenses 110b. The intensity of the emitted blue light B1 peaks, for example, at 445 nm. The plurality of semiconductor lasers 110a are arranged in an array in a single plane perpendicular to the illumination optical axis 100ax. The semiconductor lasers 110a can instead each be a semiconductor laser that emits blue light having a wavelength other than 445 nm, for example, 455 nm or 460 nm.

The collimator lenses 110b are arranged in an array in a single plane perpendicular to the illumination optical axis 100ax in correspondence with the plurality of semiconductor lasers 110a. The collimator lenses 110b each convert the blue light B1 emitted from the corresponding semiconductor laser 110a into parallelized light.

The retardation film 43 is formed of a half wave plate including a rotating mechanism. The retardation film 43 arbitrarily changes the ratio between P-polarized light and S-polarized light contained in a light beam flux K containing the plurality of blue light beams B1 outputted from the excitation light source unit 110.

The polarization separator 44 is a polarizing beam splitter (PBS) and so disposed as to incline by 45° with respect to the illumination optical axis 100ax. The polarization separator 44 transmits the P-polarized component of the light incident thereon (light beam flux K) and reflects the S-polarized component of the incident light. The P-polarized component passes through the polarization separator 44 and travels as excitation light B2 toward the first homogenizer system 45. The S-polarized component is reflected off the polarization separator 44 and travels as blue light B3 toward the total reflection mirror 50.

The first homogenizer system 45 includes, for example, a first multi-lens array 45a and a second multi-lens array 45b. The first homogenizer system 45 converts the optical intensity distribution of the excitation light B2 (P-polarized component) into a uniform distribution, what is called a top-hat distribution, on the wavelength converter 120. The first homogenizer system 45, along with the first light focusing system 46, superimposes a plurality of narrow light fluxes having exited out of a plurality of lenses of the first multi-lens array 45a on each other on the wavelength converter 120. The excitation light B2 with which the wavelength converter 120 is irradiated thus has a uniform optical intensity distribution.

The light focusing system 46 is disposed in the optical path from the first homogenizer system 45 to the wavelength converter 120, focuses the excitation light B2, and causes the focused excitation light B2 to be incident on the wavelength converter 120. In the present embodiment, the first light focusing system 46 is formed of a convex lens. The first light focusing system 46 corresponds to the "light focusing system" described in the appended claims.

The wavelength converter 120 according to the present embodiment has the same configuration as that of the wavelength converter 20 according to the first embodiment except that the excitation light B2 incident on the wavelength conversion layer 24 is entirely converted into the fluorescence Y. That is, the wavelength converter 120 according to the present embodiment outputs only the fluorescence Y produced by the incidence of the excitation light B2. A dichroic film characterized in that it reflects the excitation light B2 and transmits the fluorescence Y is therefore provided on the light exiting surface 24b (see FIG. 3) of the wavelength converter 120. Providing the thus functioning dichroic film prevents the excitation light B2 that has not undergone the wavelength conversion in the wavelength conversion layer 24 from exiting via the light exiting surface 24b.

Also in the present embodiment, the position where the excitation light B2 is focused by the first light focusing system 46 coincides with the center C of the circle having the curvature radius of the curved surface 22a of the light transmitting member 22 (see FIG. 3).

The first pickup lens 48 is formed, for example, of a convex lens and roughly parallelizes the fluorescence Y emitted from the wavelength converter 120.

The total reflection mirror 50 is disposed in the optical path of the blue light B3 and totally reflects the blue light B3 (S-polarized component) separated by the polarization separator 44 toward the second homogenizer system 52.

The second homogenizer system 52 includes, for example, a first multi-lens array 52a and a second multi-lens array 52b. The second homogenizer system 52, along with the second light focusing system 53, superimposes a plurality of narrow light fluxes having exited out of a plurality of lenses of the first multi-lens array 52a on each other on the reflective rotary diffuser 54. The blue light B3 with which the reflective rotary diffuser 54 is irradiated thus has a uniform optical intensity distribution.

The second light focusing system 53 is disposed in the optical path from the second homogenizer system 52 to the reflective rotary diffuser 54, focuses the blue light B3, and causes the focused blue light B3 to be incident on the reflective rotary diffuser 54. The second light focusing system 53 is formed of a convex lens.

The reflective rotary diffuser 54 diffusively reflects the blue light B3 having exited out of the second light focusing system 53 toward the second pickup lens 55. Among a variety of diffusively reflecting components, it is preferable to use, as the reflective rotating diffuser 54, a component that diffusively reflects a light beam incident thereon in a Lambertian reflection scheme or in a manner close to the Lambertian reflection scheme.

The second pickup lens 55 is formed, for example, of a convex lens and roughly parallelizes the blue light B3 outputted from the reflective rotary diffuser 54. The parallelized blue light B3 is incident on the dichroic mirror 49. The dichroic mirror 49 transmits the yellow fluorescence Y emitted from the wavelength converter 120 and reflects the blue light B3 incident along the direction perpendicular to the traveling direction of the fluorescence Y along the optical axis along which the fluorescence Y travels to combine the fluorescence Y and the blue light B3 with each other into the white illumination light WL.

The diffused light (blue light B3) outputted from the reflective rotary diffuser 54 is thus combined with the fluorescence Y having passed through the dichroic mirror 49 to produce the white illumination light WL. The white illumination light WL enters the color separation system 3 via the uniform illumination system 80 shown in FIG. 1.

As described above, also in the configuration in the present embodiment, the wavelength converter 120 is efficiently cooled, whereby the light source apparatus 2A can suppress a decrease in the wavelength conversion efficiency. Further, the reliability of the light source apparatus 2A can be improved. Moreover, the illumination light WL containing the fluorescence Y produced by the light source apparatus 2A allows the projector 1 to display high-luminance video images and have improved reliability.

The invention is not limited to the contents of the embodiments described above and can be changed as appropriate to the extent that the change does not depart from the substance of the invention.

For example, the above embodiments have been described with reference to the case where the light transmitting member 22 has a roughly hemispherical shape, but the shape of the light transmitting member 22 is not limited to this. The light transmitting member 22 may be a plate-shaped member that can dissipate the heat at the light incident surface 24a of the wavelength conversion layer 24. In this case, the excitation light B is refracted at the light incident surface of the light transmitting member, but the excitation light B can be focused on the light incident surface 24a of the wavelength conversion layer 24 by adjustment of the light focus position of the light focusing system 13.

In the embodiments described above, the projector 1 including the three light modulators 4R, 4G, and 4B is presented by way of example, and the invention is also applicable to a projector that displays color video images via one light modulator. Further, a digital mirror device may instead be used as each of the light modulators.

The above embodiments have been described with reference to the case where the light source apparatus according to each of the embodiments of the invention is incorporated in a projector, but the light source apparatus is not limited to be incorporated in a projector. The light source apparatus according to each of the embodiments of the invention can also be used, for example, in a lighting apparatus and an automobile headlight.

The entire disclosure of Japanese Patent Application No. 2017-159409, filed on Aug. 22, 2017 is expressly incorporated by reference herein.

What is claimed is:

1. A wavelength converter comprising:
   a wavelength conversion layer formed of a ceramic phosphor and having a light incident surface on which excitation light is incident and a light exiting surface which faces the light incident surface;
   a light transmitting layer formed integrally with the light incident surface of the wavelength conversion layer; and
   a light transmitting member provided on a side of the light transmitting layer that is a side on which the excitation light is incident,
   wherein the light transmitting layer and the light transmitting member are bonded to each other with the aid of optical contact,
   the light transmitting member has a curved surface that protrudes in a direction opposite a traveling direction of the excitation light, and
   a dichroic film that transmits the excitation light and reflects fluorescence emitted from the wavelength conversion layer is provided on the curved surface.

2. A wavelength converter according to claim 1,
   wherein the light transmitting layer is made of transparent alumina, and
   the wavelength conversion layer and the transparent alumina of the light transmitting layer are formed integrally with each other in a sintering process.

3. The wavelength converter according to claim 2,
   wherein the light transmitting member is made of sapphire.

4. A light source apparatus comprising:
   the wavelength converter according to claim 1; and
   an excitation light source that emits the excitation light.

5. A light source apparatus comprising:
   the wavelength converter according to claim 2; and
   an excitation light source that emits the excitation light.

6. A light source apparatus comprising:
   the wavelength converter according to claim 3; and
   an excitation light source that emits the excitation light.

7. A light source apparatus comprising:
   the wavelength converter according to claim 1;
   an excitation light source that emits the excitation light; and
   a light focusing system that focuses the excitation light emitted from the excitation light source on the light incident surface of the wavelength conversion layer,
   wherein a center of a circle having a curvature radius of the curved surface is located on the light incident surface, and
   a position where the excitation light is focused by the light focusing system coincides with the center of the circle having the curvature radius of the curved surface.

8. A projector comprising:
   the light source apparatus according to claim 4;
   a light modulator that modulates light from the light source apparatus in accordance with image information to produce image light; and
   a projection optical apparatus that projects the image light.

9. A projector comprising:
   the light source apparatus according to claim 5;
   a light modulator that modulates light from the light source apparatus in accordance with image information to produce image light; and
   a projection optical apparatus that projects the image light.

10. A projector comprising:
    the light source apparatus according to claim 6;
    a light modulator that modulates light from the light source apparatus in accordance with image information to produce image light; and
    a projection optical apparatus that projects the image light.

11. A projector comprising:
    the light source apparatus according to claim 7;
    a light modulator that modulates light from the light source apparatus in accordance with image information to produce image light; and
    a projection optical apparatus that projects the image light.

12. A wavelength converter according to claim 1,
    wherein the light transmitting layer and the light transmitting member are bonded by intermolecular force therebetween.

13. A light source apparatus comprising:
    the wavelength converter according to claim 12; and
    an excitation light source that emits the excitation light.

14. A projector comprising:
    the light source apparatus according to claim 13;
    a light modulator that modulates light from the light source apparatus in accordance with image information to produce image light; and
    a projection optical apparatus that projects the image light.

* * * * *